Sept. 21, 1943.   R. A. HENNING   2,329,898
SPRING ATTACHMENT FOR CONTROL LEVERS
Filed Sept. 14, 1942
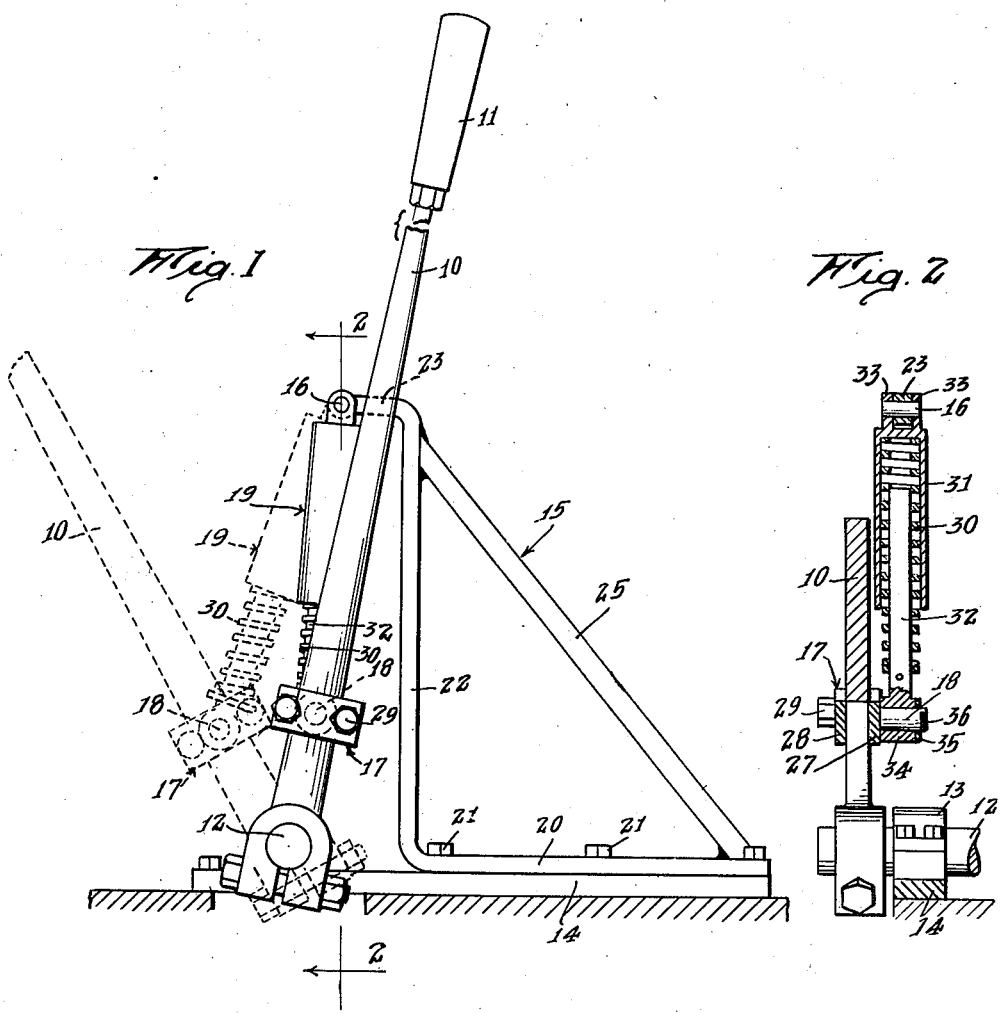
Inventor
Raymond A. Henning
By Lyon & Lyon
Attorneys Patented Sept. 21, 1943

2,329,898

UNITED STATES PATENT OFFICE 2,329,898

SPRING ATTACHMENT FOR CONTROL LEVERS

Raymond A. Henning, Junction City, Oreg., assignor of seventy-five per cent to Charles S. Johnson, Piru, Calif.

Application September 14, 1942, Serial No. 458,244

1 Claim. (Cl. 74—97)

This invention relates to an attachment to be applied to the steering levers of caterpillar tractors, although it is also useful on other control levers which work against a stiff spring.

An object of the invention is to provide a simple, relatively inexpensive, attachment that can be readily installed on existing control levers for facilitating the movement of the lever through a portion of its arc of motion.

The invention involves a particular adaptation of what has been sometimes referred to as an "overcenter" spring. Such springs have been employed on the clutch pedal linkage of some automobiles for a number of years to reduce the force required to depress the clutch pedal, without increasing the tendency of the clutch to slip when the pedal is not intentionally depressed. The overcenter spring accomplishes this desired result because it is so mounted that when the clutch is engaged the spring force acts at right angles to the direction of movement of the link to which it is attached, so that it exerts no effective component on the link; however, when the clutch pedal is moved out of normal position the spring exerts an increasing component in a direction effective to aid the disengagement of the clutch.

The attachment of the present invention involves a spring adapted to be connected to a control lever in a similar manner so that when the lever is in one end of its swing the spring exerts force substantially radially with respect to the axis of movement of the lever, but as the lever is moved out of the said end position the spring force is applied in such a direction as to have a component aiding the movement of the lever.

It is common practice to steer caterpillar tractors by selectively applying power to the treads on the right and left sides of the machine. The usual arrangement is to connect the powerplant to each tread through a separate clutch and provide two levers mounted side by side for actuating the two clutches. The operator can then steer the machine to the right by pulling on the right lever, or steer it to the left by pulling on the left lever. Pulling either lever disengages its associated clutch so that the tread on that side of the machine is stopped and the driving force applied to the tread on the other side of the machine turns the machine. Similar steering arrangements are employed not only on tractors but on tanks and other military machines employing endless tracks for their propulsion. I have found that on many of these machines the clutch springs are extremely stiff so that the operator must exert substantial force on the steering levers in order to actuate them. These stiff clutch springs could be compensated for by building in overcenter clutch springs, such as have previously been referred to, in connection with automobiles. However, many machines of this type are already in the field and it is a difficult task to incorporate the overcenter springs of the prior art in these existing machines. In accordance with the present invention, I have developed an overcenter spring arrangement that can be attached directly to the steering levers of existing tractors and the like so as to reduce the force required to steer the vehicle to as great an extent as may be desired.

The invention will now be explained by describing in detail a preferred embodiment thereof, as illustrated in the drawing, in which Fig. 1 is a side elevation view of a control lever with the attachment of the present invention; and Fig. 2 is a sectional view, taken substantially along the line II—II of Fig. 1.

There is shown in the drawing a control lever 10 having a handle 11 at its upper end and being attached at its lower end to a shaft 12. The shaft 12 is rotatably supported in bearings 13, one only of which appears in the drawing. The shaft may be extended to any desired distance and be connected by any desired mechanical linkage with the device that it is to be controlled by the lever 10. It will be assumed in the present instance that the shaft 12 is connected to a clutch of a tractor or the like, and that the bearing 13 is mounted on a base member 14. It will further be assumed that when the lever is in the full line position shown in Fig. 1, the clutch is fully engaged, and when the lever is swung counterclockwise into the dotted line position, the clutch is disengaged. As will be readily understood the lever 10 must work against the usual clutch springs in moving from the full line to the dotted line position, and sufficient force will have to be applied to the handle 11 to overcome the clutch springs.

The attachment of the present invention comprises a bracket 15 attachable to the base 14 and carrying a pivot pin 16, a clamp 17 attachable to the lever 10 and carrying a pivot pin 18, and a spring assembly 19 compressible between the pivot pins 16 and 18.

The bracket 15 may be formed of strap iron having a base section 20 adapted to be secured by bolts 21 to the base member 14 of the tractor and being bent up at one end to form a vertically extending section 22, the upper end of which is bent to form a horizontal section 23, the extreme end of which has an eye therein to receive the pivot pin 16 which projects from both sides of the eye. The sections or legs 20 and 22 of the bracket are preferably reinforced with a diagonal bracing member 25 which may be welded to the sections 20 and 22.

The clamp 17 may be formed in two sections 27 and 28, respectively, which are clamped against opposite sides of the lever 10 by a bolt 29. The pivot pin 18 projects from the clamp member 27 parallel to the pivot pin 16 and to the shaft 12.

The spring assembly includes a relatively stiff helical compression spring 30, a sleeve member 31 surrounding the upper portion of the spring, and a core member 32 extending into the lower end of the spring and partly into the sleeve 31. The sleeve 31 is pivotally secured to the pivot pin 16 having a pair of ears 33 which straddle the member 23 and have eyes to engage the pin 16. The core member 32 is formed integrally with a hub member 34; it is rotatably mounted on the pivot 18 and detachably secured thereto by a washer 35 and cotterpin 36. The sleeve 31 and the core 32 maintain the compression spring 30 in straight condition and prevent it from buckling.

As shown in Fig. 1 the bracket 15 is so positioned that the pivot pin 16 is to the left of the lever 10 when the latter is in extreme clockwise position so that the force of the spring 30 exerts a slight clockwise component of force on the lever, tending to hold it in normal position. However, when the lever 10 is manually swung counter-clockwise a relatively slight movement thereof carries it past the pivot 16 and thereafter the force of the spring helps to move the lever, thereby requiring the exertion of less strength by the operator.

The effective force exerted by the spring 30 can be varied by shifting the clamp 17 upwardly or downwardly along the lever 10. This is advantageous because different operators may prefer different degrees of response to movement of the lever.

It is also to be understood that the bracket 15 can be mounted in different positions to vary the position of the pivot 16 relative to the normal position of the lever 10. If desired, the pivot pin 16 may be positioned in alignment with the normal position of the lever 10 so that the spring 30 begins to aid the operator immediately in response to movement of the lever counter-clockwise out of normal position.

Although for the purpose of explaining the invention a specific embodiment thereof is described in substantial detail, it is to be understood that various changes can be made from the exact construction shown without departing from the invention, and the latter is to be limited only to the extent set forth in the appended claim.

I claim:

An attachment for a manual clutch control lever having a handle on its upper end and swingable in one direction from a stop position to disengage a clutch against the force of a clutch spring, said attachment comprising: a bracket having a first pivot element, and means for anchoring said bracket in stationary position with said first pivot element substantially alongside said lever when the latter is in said stop position, said pivot being spaced substantially from the fulcrum axis of the lever, a second pivot means, and means for detachably connecting it to said lever at an intermediate point thereon closer to the fulcrum of the lever than said first pivot means, and compression spring means interposed between said first and second pivot means for yieldably urging said lever in said one direction following initial movement of the lever out of said stop position.

RAYMOND A. HENNING.